United States Patent
Borlick et al.

(10) Patent No.: US 10,013,181 B2
(45) Date of Patent: Jul. 3, 2018

(54) DISTRIBUTED STORAGE OF DATA IN A LOCAL STORAGE AND A HETEROGENEOUS CLOUD

(71) Applicant: INTERNATIONAL BUSINESS MACHINES CORPORATION, Armonk, NY (US)

(72) Inventors: Matthew G. Borlick, Tucson, AZ (US);
Lokesh M. Gupta, Tucson, AZ (US);
Roger G. Hathorn, Tucson, AZ (US);
Karl A. Nielsen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/961,208

(22) Filed: Dec. 7, 2015

(65) Prior Publication Data

US 2017/0160951 A1 Jun. 8, 2017

(51) Int. Cl.
*G06F 3/06* (2006.01)

(52) U.S. Cl.
CPC ............ *G06F 3/0611* (2013.01); *G06F 3/064* (2013.01); *G06F 3/067* (2013.01); *G06F 3/0622* (2013.01); *G06F 3/0683* (2013.01); *G06F 3/0685* (2013.01)

(58) Field of Classification Search
CPC .... G06F 3/0611; G06F 3/0685; G06F 3/0683; G06F 3/064; G06F 3/0622; G06F 3/067
See application file for complete search history.

(56) References Cited

U.S. PATENT DOCUMENTS

| | | | |
|---|---|---|---|
| 8,654,971 B2 | 2/2014 | Orsini et al. | |
| 8,849,955 B2 * | 9/2014 | Prahlad | G06F 17/3002 709/211 |
| 9,052,962 B2 | 6/2015 | Lee et al. | |
| 9,075,529 B2 | 7/2015 | Karve et al. | |
| 9,258,765 B1 | 2/2016 | dacosta | |
| 2005/0078702 A1 | 4/2005 | Heuer et al. | |
| 2005/0157662 A1* | 7/2005 | Bingham | H04L 63/1425 370/254 |
| 2007/0153763 A1* | 7/2007 | Rampolla | H04L 41/0806 370/351 |
| 2007/0204089 A1* | 8/2007 | Proctor | G06F 11/1443 710/301 |
| 2008/0148063 A1 | 6/2008 | Hanko et al. | |
| 2009/0300707 A1 | 12/2009 | Garimella et al. | |
| 2010/0325199 A1* | 12/2010 | Park | G06F 17/30067 709/203 |

(Continued)

OTHER PUBLICATIONS

Ben Joan, "Difference Between MTP and MSC", Apr. 25, 2010, DifferenceBetween.net. Retrieved on Apr. 16, 2017 from <http://www.differencebetween.net/technology/differencebetweenmtpandmsc/>.*

(Continued)

*Primary Examiner* — Arpan P. Savla
(74) *Attorney, Agent, or Firm* — Rabindranath Dutta; Konrad Raynes Davda & Victor LLP

(57) ABSTRACT

Provided are a method, a system, and a computer program product in which a storage controller determines a plurality of parts of a dataset. At least one part of the dataset is stored in a local storage coupled to the storage controller. At least one other part of the dataset in one or more cloud storages coupled to the storage controller.

17 Claims, 10 Drawing Sheets

(56) References Cited

U.S. PATENT DOCUMENTS

| | | | |
|---|---|---|---|
| 2012/0042162 | A1 | 2/2012 | Anglin et al. |
| 2012/0116846 | A1 | 5/2012 | Levy et al. |
| 2012/0303736 | A1 | 11/2012 | Novotny et al. |
| 2013/0086283 | A1 | 4/2013 | Miller et al. |
| 2013/0086415 | A1 | 4/2013 | Petersen et al. |
| 2013/0179985 | A1* | 7/2013 | Strassmann ............. G06F 21/60 726/26 |
| 2013/0204849 | A1 | 8/2013 | Chacko |
| 2014/0181901 | A1* | 6/2014 | Markel .................. H04L 29/06 726/3 |
| 2014/0201541 | A1 | 7/2014 | Paul et al. |
| 2015/0052354 | A1 | 2/2015 | Purohit |
| 2015/0304343 | A1 | 10/2015 | Cabrera et al. |
| 2015/0347489 | A1 | 12/2015 | Sherwin |
| 2015/0379292 | A1 | 12/2015 | Lewis |
| 2016/0004611 | A1* | 1/2016 | Lakshman .......... G06F 11/2058 714/6.23 |
| 2016/0162693 | A1* | 6/2016 | Breuer ................. G06F 21/602 713/164 |

OTHER PUBLICATIONS

List of IBM Patents or Patent Applications Treated as Related, dated Dec. 7, 2015, pp. 2.
Singh, et al., "A Secured Cost-Effective Multi-Cloud Storage in Cloud Computing," IEEE INFOCOM 2011 Workshop on Cloud Computing, IEEE, pp. 625-630, 2011.
Alice, et al. "Enhancing Security of Multi-Cloud Architecture using Combination of Approaches," 2015 IJSRSET, v.1, i.2, pp. 250-253, Mar.-Apr. 2015.
U.S. Appl. No. 14/961,166, filed Dec. 7, 2015.
U.S. Appl. No. 14/961,247, filed Dec. 7, 2015.
Office Action dated Apr. 1, 2016, pp. 17, for U.S. Appl. No. 14/961,166, filed Dec. 7, 2015.
Office Action dated May 10, 2016, pp. 23, for U.S. Appl. No. 14/961,247, filed Dec. 7, 2015.
Response dated Aug. 10, 2016, pp. 12, to Office Action dated May 10, 2016, pp. 23, for U.S. Appl. No. 14/961,247, filed Dec. 7, 2015.
Response dated Jun. 29, 2016, pp. 11, to Office Action dated Apr. 1, 2016, pp. 17, for U.S. Appl. No. 14/961,166, filed Dec. 7, 2015.
Final Office Action dated Sep. 29, 2016, pp. 20, for U.S. Appl. No. 14/961,247, filed Dec. 7, 2015.
Final Office Action dated Oct. 21, 2016, pp. 25, for U.S. Appl. No. 14/961,166, filed Dec. 7, 2015.
Response dated Dec. 28, 2016, pp. 12, to Final Office Action dated Sep. 29, 2016, pp. 20, for U.S. Appl. No. 14/961,247, filed Dec. 7, 2015.
Response dated Jan. 23, 2017, pp. 12 to Final Office Action dated Oct. 21, 2016, pp. 25, for U.S. Appl. No. 14/961,166, filed Dec. 7, 2015.
Ex Parte Quayle dated Aug. 30, 2017, pp. 13, for U.S. Appl. No. 14/961,247, filed Dec. 7, 2015.
Office Action dated Jun. 14, 2017, pp. 31, for U.S. Appl. No. 14/961,166, filed Dec. 7, 2015.
I. Morozan, "Multi Clouds Database: A New Model to Provide Security in Cloud Computing", (online) https://www.researchgate.net/publication/273136522 (accessed on Apr. 1, 2015).
Response dated Sep. 14, 2017, pp. 13, to Office Action dated Jun. 14, 2017, pp. 31, for U.S. Appl. No. 14/961,166, filed Dec. 7, 2015.
M. Schnjakin, et al., "Applying Erasure Codes for Fault Tolerance in Cloud-RAID", 2013 IEEE 16th International Conference on Computational Science and Engineering, pp. 10.
I. Arora, et al., "Cloud Databases: A Paradigm Shift in Databases", International Jourance of Computer Science, Issues, vol. 9, Issue 4, No. 3, Jul. 2012, pp. 7.
M.Mowbray, et al., "Enhancing Privacy in Cloud Computing via Policy-Based Obfuscation", The Journal of Supercomputing, 2010, pp. 25.
M. Schnjakin, et al., "Evaluation of Cloud-RAID: A Secure and Reliable Storage Above the Clouds", 2013 22nd International Conference on Computer Communication and Networks, Nassau, 2013, pp. 9.
C. Curino, et al., "Relational Cloud: A Database-as-a-Service for the Cloud", 5th Biennial Conference on Innovative Data Systems Research, CIDR 2011, Jan. 9-12, 2011, pp. 7.
J. Wang, et al., "Reducing Storage Overhead with Small Write Bottleneck Avoiding in Cloud RAID System", IEEE Computer Society, 2012 ACM/IEEE 13th International Conference on Grid Computing, pp. 10.
W. Qiyue, "Research on Column-Store Databases Optimization Techniques", IEEE, 2015 International Conference on Logistics, Informatics and Service Sciences, Barcelona 2015, pp. 6.
Response dated Oct. 30, 2017, pp. 14, to Ex Parte Quayle dated Aug. 30, 2017, pp. 13, for U.S. Appl. No. 14/961,247, filed Dec. 7, 2015.
Notice of Allowance dated Dec. 20, 2017, pp. 22, for U.S. Appl. No. 14/961,247, filed Dec. 7, 2015.
Notice of Allowance dated Dec. 18, 2017, pp. 25, for U.S. Appl. No. 14/961,166, filed Dec. 7, 2015.
Notice of Allowance dated Apr. 4, 2018, pp. 14, for U.S. Appl. No. 14/961,166, filed Dec. 7, 2015.

* cited by examiner

DISTRIBUTED STORAGE OF DATA IN A LOCAL STORAGE AND A HETEROGENEOUS CLOUD

BACKGROUND

1. Field

Embodiments relate to a method, system, and computer program product for distributed storage of data in a local storage and a heterogeneous cloud.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments a storage controller may comprise a plurality of storage servers that are coupled to each other, where one or more of the storage servers may comprise a plurality of processing nodes or servers. The storage controller allows host computing systems to perform input/output (I/O) operations with storage devices controlled by the storage controller.

Local storage comprising a plurality of hard disks, tape drivers, solid state disks (SSD) may be coupled to the storage controller. Redundant array of independent disks (RAID) is a data storage virtualization technology that combines multiple disk drive components into a single logical unit for data redundancy or performance improvement. Data is distributed across the drives in one of several ways, referred to as RAID levels, depending on the specific level of redundancy and performance required. The different schemes or architectures are named by the word RAID followed by a number (e.g. RAID 0, RAID 1). Each scheme provides a different balance among the goals of reliability, availability, performance, and capacity. For example, RAID levels greater than RAID 0 provide protection against unrecoverable read errors, as well as whole disk failures. The storage devices of the local storage may be configured as a RAID.

Network security is a branch of computer security specifically related to networks, and may involve browser security, security of data in transmission, security of other applications in the networked environment, security of the operating systems of computers in the networked environment, etc. Computer communications represents an insecure channel for exchanging information leading to a high risk of intrusion or fraud, such as via the interception and decryption of communications. Different mechanisms have been used to protect the transfer of data via various communications protocols that may include encryption and/or other operations to securely establish connections and transfer data. For example a Secure Sockets Layer (SSL) protocol may be used for connections between two computational devices. A Virtual Private Network (VPN) protocol may be used to link two computational devices such that they appear to be in a local private network. A VPN tunnel may be used to securely communicate between the two computational devices. Internet Protocol Security (IPsec) is a set of protocols that run over the Internet Protocol (IP) layer. IPSec allows two or more computational devices to communicate in a secure manner by authenticating and encrypting each IP packet of a communication session. A VPN established over IPSec is referred to as an IPSec VPN. OpenVPN is an open-source software application that provides virtual VPN techniques for creating secure point-to-point or site-to-site connections in routed or bridged configurations and remote access facilities. Internet direct connect is another mechanism for secure data communications. Various other communications protocols may be used for secure data communications.

SUMMARY OF THE PREFERRED EMBODIMENTS

Provided are a method, a system, and a computer program product in which a storage controller determines a plurality of parts of a dataset. At least one part of the dataset is stored in a local storage coupled to the storage controller. At least one other part of the dataset in one or more cloud storages coupled to the storage controller.

In certain embodiments, the at least one part of the dataset stored in the local storage requires greater security than the at least one other part of the dataset that is stored in the one or more cloud storages.

In certain other embodiments, the at least one part of the dataset stored in the local storage requires faster access than the at least one other part of the dataset that is stored in the one or more cloud storages.

In certain embodiments, determining which part of the dataset to store in local storage, and which part of the dataset to store in which of the one or more cloud storages is based on a plurality of factors including security features provided by the one or more cloud storages and the local storage, speed of access provided by the one or more cloud storages and the local storage, communications protocols for communication with the one or more cloud storages, and configuration of local storage devices and selected cloud storages as RAID.

In yet further embodiments, the one or more cloud storages include a first cloud storage and a second cloud storage. The storage controller communicates via a first communications protocol with the first cloud storage. The storage controller communicates via a second communications protocol that is different from the first communications protocol with the second cloud storage, wherein any or all of the communications protocols are changed over time or in response to a compromise in any or all of the communications protocols.

In certain embodiments, the local storage and the one or more cloud storages are configured as a Redundant Array of Independent Disks (RAID).

In additional embodiments, the storage controller is coupled to a plurality of hosts, wherein the one or more cloud storages include a first cloud storage managed by a first vendor and a second cloud storage managed by a second vendor, wherein the first cloud storage is separated at least by 10 kilometers from the second cloud storage, and wherein the first cloud storage and the second cloud storage provide cloud computing services to the storage controller for the plurality of hosts.

BRIEF DESCRIPTION OF THE DRAWINGS

Referring now to the drawings in which like reference numbers represent corresponding parts throughout.

DETAILED DESCRIPTION

Figure 1:
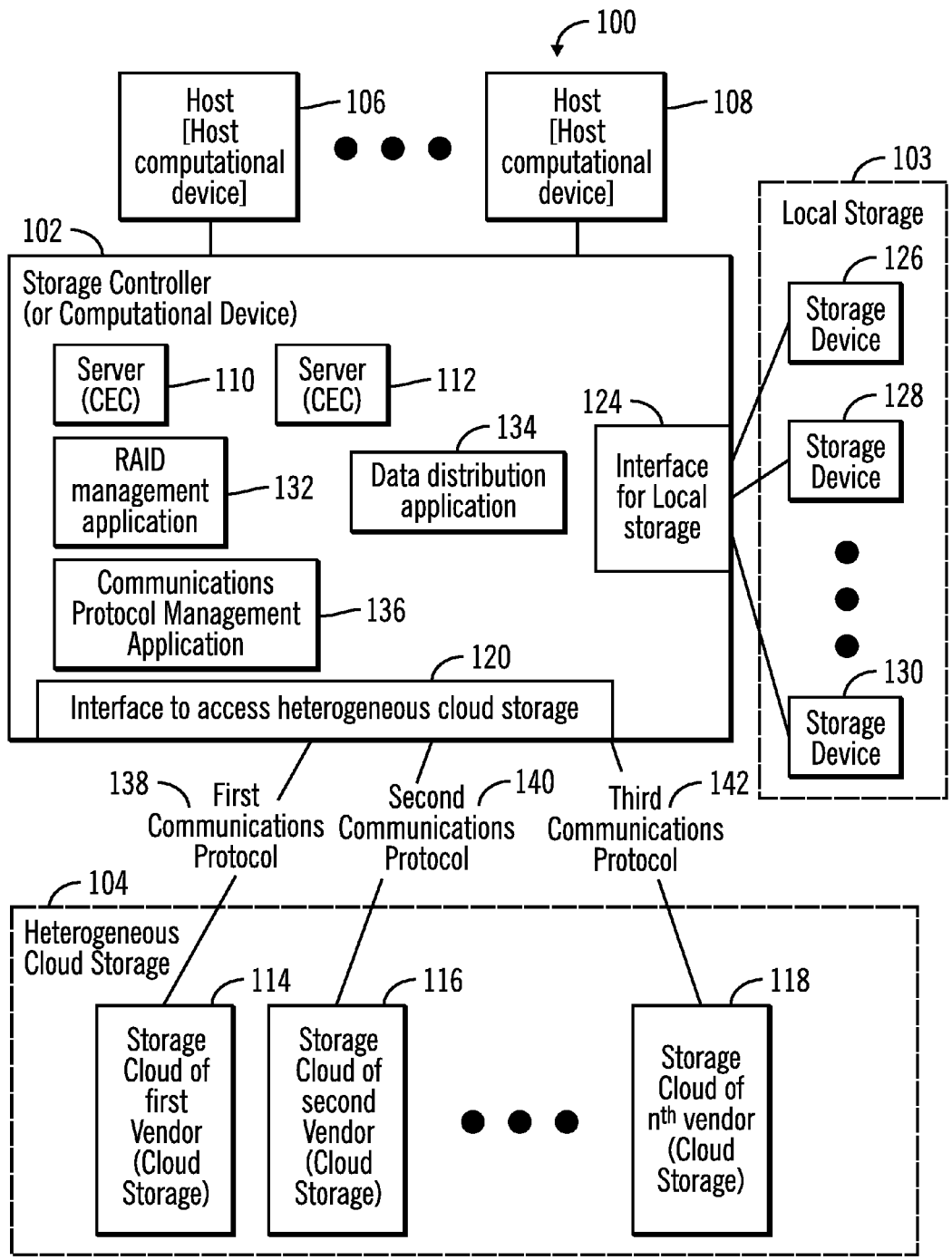
FIG. 1 illustrates a block diagram of a computing environment comprising a storage controller coupled to a local storage and a heterogeneous cloud storage, in accordance with certain embodiments.

In the following description, reference is made to the accompanying drawings which form a part hereof and which illustrate several embodiments. It is understood that other embodiments may be utilized and structural and operational changes may be made.

There are many security issues, data loss issues, and access speed issues, associated with cloud storage. For example, cloud storage may be provide a relatively lower level of security for data than local storage coupled to a storage controller because data may be intercepted by unauthorized entities while data is being transmitted to or from the cloud storage to the storage controller. It may also be more time consuming to access data from the cloud storage than from the local storage. Furthermore, different cloud storages may provide different levels of security for data stored in the storage devices of the cloud storages. For example, some cloud storages may provide greater security for data in comparison to other cloud storages.

Certain embodiments divide a dataset into a plurality of parts and determine whether to store a dataset part in local storage or in an appropriate cloud storage of a plurality of cloud storages provided by a plurality of vendors. The factors for placement of the dataset part may include security features provided by the one or more cloud storages and the local storage, speed of access provided by the one or more cloud storages and the local storage, communications protocols for communication with the one or more cloud storages, and configuration of local storage devices and selected cloud storages as RAID.

For example, storing password on a cloud storage may have security issues because if the cloud storage is compromised then the password may be stolen and may be used in an unauthorized manner. If a cloud device that stores the password fails, then the password information may be lost.

Certain embodiments ensure security and avoid data loss by using cloud storages from different vendors (i.e., by providing a heterogeneous cloud storage environment) and at the same time using a local storage coupled to the storage controller. Certain embodiments stripe information across the various cloud storages and storage devices of the local storage by configuring RAID arrays from the various cloud storages and the storage devices of the local storage. If a cloud storage or the local storage is not operational or inaccessible, the data or parity may be read from the remaining operational storages to reconstruct the data on the non-operational or inaccessible storage.

Certain embodiments divide the data into multiple parts, and consistently store different parts of the data in different cloud storage devices maintained by different vendors and the local storage. For example, by storing the first half of a password in the local storage and by storing the other half of the password in a cloud storage greater security may be provided against theft and unauthorized use of password. If the cloud storage is compromised then only a part of a password may be compromised. The embodiments may be implemented with or without encryption of the parts of the data. As a software defined storage interface, elements of a database may be persistently assigned to be stored to different cloud storages and local storage in such a way as to minimize the impact of the loss of any one element, in the event of one or more compromised cloud storages or the local storage.

Exemplary Embodiments

FIG. 1 illustrates a block diagram of a computing environment 100 comprising a storage controller 102 coupled to a local storage 103 and a heterogeneous cloud storage 104, in accordance with certain embodiments. The storage controller 102 allows a plurality of host computational devices 106, 108 to perform input/output (I/O) operations with logical storage maintained by the storage controller 102. The physical storage corresponding to the logical storage is found in the local storage 103 and the heterogeneous cloud storage 104.

The storage controller 102 comprises a plurality of server computational devices 110, 112. The server computational devices 110, 112 may also be referred to as servers or central electronic complexes (CEC) or processor complexes. The storage controller 102 may comprise a set of hardware that includes central processing units (CPU), memory, channels, controllers, etc. The servers 110, 112 of the storage controller 102, the storage controller 102, and the hosts 106, 108 may comprise any suitable computational device including those presently known in the art, such as, a personal computer, a workstation, a server, a mainframe, a hand held computer, a palm top computer, a telephony device, a network appliance, a blade computer, a processing device, etc. The servers 110, 112, the storage controller 102, and the hosts 106, 108 may be elements in any suitable network, such as, a storage area network, a wide area network, the Internet, an intranet. In certain embodiments, the servers 110, 112 may function redundantly and one server may be able to take over the operations of the other server. In certain embodiments, the servers 110, 112 of the storage controller 102, the storage controller 102 coupled to the local storage 103, the hosts 106, 108, and the heterogeneous cloud storage 104 may be elements in a cloud computing environment that comprises the computing environment 100.

The heterogeneous cloud storage 104 may be comprised of a plurality of storage clouds 114, 116, 118 where each of the plurality of storage clouds may be provided and maintained by a different entity. For example, a first vendor may provide the storage cloud 114, a second vendor may provide the storage cloud 116, and a third vendor may provide the storage cloud 118. The different storage clouds may be placed at different geographical locations separated by a considerable distance, such as at least 10 kilometers. The different storage clouds may be physically located in different states or countries, e.g., storage cloud 114 may be located in the United States, and storage cloud 116 may be located in Canada. It should be noted that the storage clouds 114, 116, 118 may also be referred to as cloud storages.

Each storage cloud 114, 116, 118 may be comprised of a plurality of storage devices, such as storage disks, tape drives, solid state storage, etc., that are maintained by a storage server that has an operating system. In certain embodiments, the storage cloud 114 maintained by the first vendor may have one operating system, whereas the storage cloud 116 maintained by the second vendor may have another operating system.

The storage controller 102 may have an interface 120 to access the heterogeneous cloud storage 104. The storage controller 102 may also have an interface 124 to access the local storage 103 that is comprised of a plurality of storage devices 126, 128, 130. The plurality of storage devices 126, 128, 130 may be comprised of storage disks, tape drives, solid state storage, etc., and may be controlled by the storage controller 102 via the servers 110, 112.

A RAID management application 132 that configures the selected storage clouds of the heterogeneous cloud storage 104 and selected storage devices of the local storage 103 as a RAID may execute in the storage controller 102. Additionally, a data distribution application 134 that distributes different parts of data in different storage clouds in the heterogeneous cloud storage 104 and the storage devices of the local storage 103 may execute in the storage controller 102.

Additionally, a communications protocol management application 136 that executes in the storage controller 102 provides mechanisms for the storage controller 102 to communicate via different communications protocol to different storage clouds 114, 116, 118 of the heterogeneous cloud storage 104. For example, the communications protocol management application 136 may use first, second, and third communications protocols 138, 140, 142 to communicate with the storage clouds 114, 116, 118 respectively, where the first, second and third communications protocol 138, 140, 142 may be different from each other.

The RAID management application 132, the data distribution application 134, and the communications protocol manager application 136 may be implemented in software, firmware, or hardware, or any combination thereof, in accordance with certain embodiments.

Figure 2:
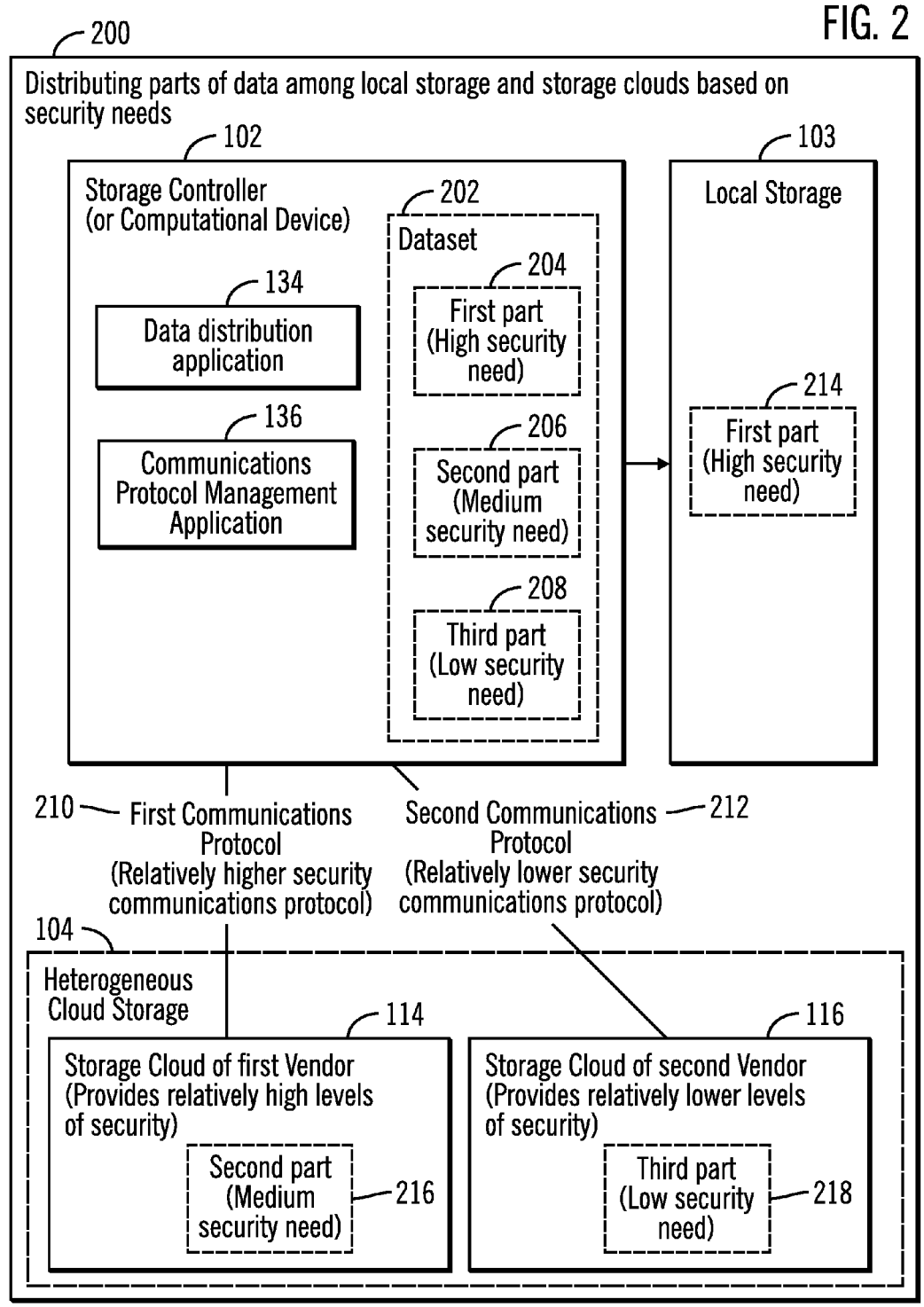
FIG. 2 illustrates a block diagram that shows distributing parts of a dataset among local storage and a plurality of storage clouds based on security needs, in accordance with certain embodiments.

FIG. 2 illustrates a block diagram 200 that shows distributing parts of a dataset 202 among local storage 103 and a plurality of storage clouds 114, 116 based on security needs, in accordance with certain embodiments. The dataset 202 may comprise any data or a collection of data, including a database, a spreadsheet, a record with fields, a collection of files, etc., that may be subdivided into parts or that is already subdivided into parts.

In FIG. 2, the storage controller 102 manages the dataset 202 that comprises a first part 204, a second part 206, and a third part 208. For example, the dataset 202 may comprise a plurality of records, where the first part 204 may comprise the first fields of the records, the second part 206 may comprise the second fields of the record, and the third part 208 may comprise the third fields of the record. For example, the records may be user records, where the first part may comprise passwords, the second part may comprise user ids corresponding to the passwords, and the third part may comprise addresses of the users.

In certain embodiments, the first part 204 may need to be stored with a high level of security, the second part 206 may have to be stored with at least a medium level of security, and the third part 208 may tolerate a low level of security.

In FIG. 2, the storage cloud 114 of the first vendor provides a relatively higher level of security for data when compared to the storage cloud 116 of the second vendor. In certain embodiments the communications protocol 210 used by the storage controller 102 to communicate with the storage cloud 114 provides a higher level of security than the communications protocol 212 used by the storage controller 102 to communicate with the storage cloud 116. In variations of the embodiments shown in FIG. 2, the communications protocols 210, 212 may provide the same level of security.

In certain embodiments, the storage data distribution application 134 in cooperation with the communications protocol management application 136 stores the first part 204 that requires high security in the local storage 103 that provides a greater security than the storage clouds 114, 116 (shown via reference numeral 214). The second part 206 that requires medium level of security is stored in the storage cloud 114 (shown via reference numeral 216), and the third part 208 is stored in the storage cloud 116 that provides a lower level of security than the storage cloud 114 (shown via reference numeral 218). Data stored in local storage 103 is provided greater security than data stored in the heterogeneous cloud storage 104, although in certain alternative embodiments greater security may be provided in some of the storage clouds of the heterogeneous cloud storage 104 in comparison to the local storage 103. In certain embodiments, passwords that require high security may be stored in the local storage 103, user ids corresponding to the passwords may be stored in the storage cloud 114 because they require medium security, and addresses of users that can tolerate low security may be stored in the storage cloud 116.

Figure 3:
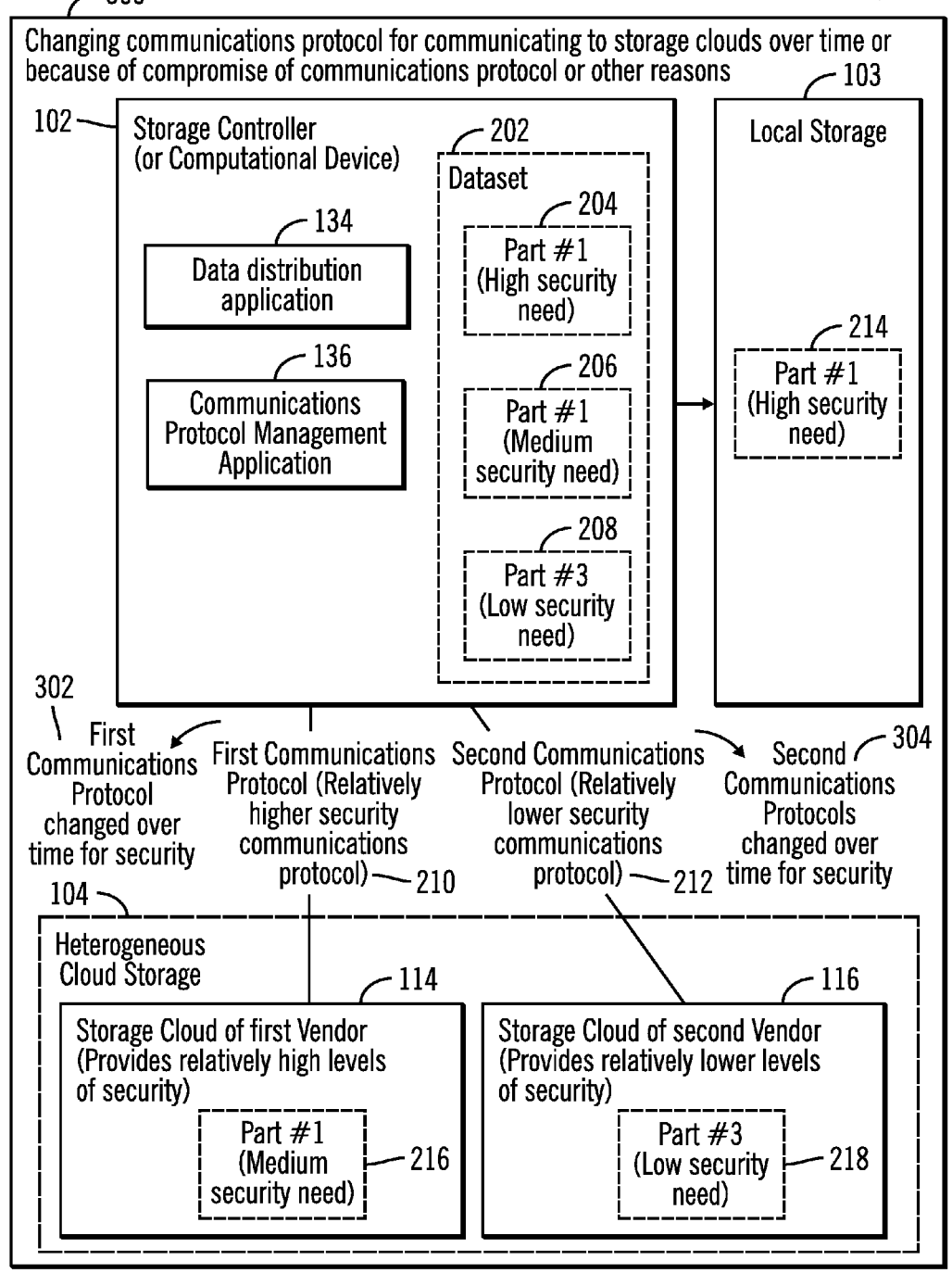
FIG. 3 illustrates a block diagram that shows changing communications protocol for communicating to storage clouds over time, in accordance with certain embodiments.

FIG. 3 illustrates a block diagram 300 that shows changing communications protocol for communicating to storage clouds over time, in accordance with certain embodiments. FIG. 3 shows the dataset 202 with parts 204, 206, 208 distributed in local storage 103, and storage clouds 114, 116 (as shown by reference numerals 214, 216, 218 and as described in FIG. 2).

In certain embodiments shown via reference numeral 302, the storage controller 102 changes the first communications protocol 210 to a different communications protocol after an elapse of a first predetermined amount of time, to transmit additional data from the storage controller 102 to the first cloud storage 114. The first communications protocol 210 may also be changed in response to a compromise of the first communications protocol 210.

In certain embodiments shown via reference numeral 304, the storage controller 102 changes the second communications protocol 212 to another communications protocol after an elapse of a second predetermined amount of time, to transmit further data to the second cloud storage 116. The second communications protocol 212 may also be changed in response to a compromise of the second communications protocol 212.

Therefore, FIG. 3 shows that communications protocols may be changed over time for communications to different storage clouds. In response to a compromise of a communications protocol, the communications protocol management application 136 may change the compromised communications protocol to another communications protocol that is not compromised. It should be noted that a communications protocol may be compromised in various ways, including via the publication or disclosure of a vulnerability in the communications protocol that may be exploited for the interception of data.

Figure 4:
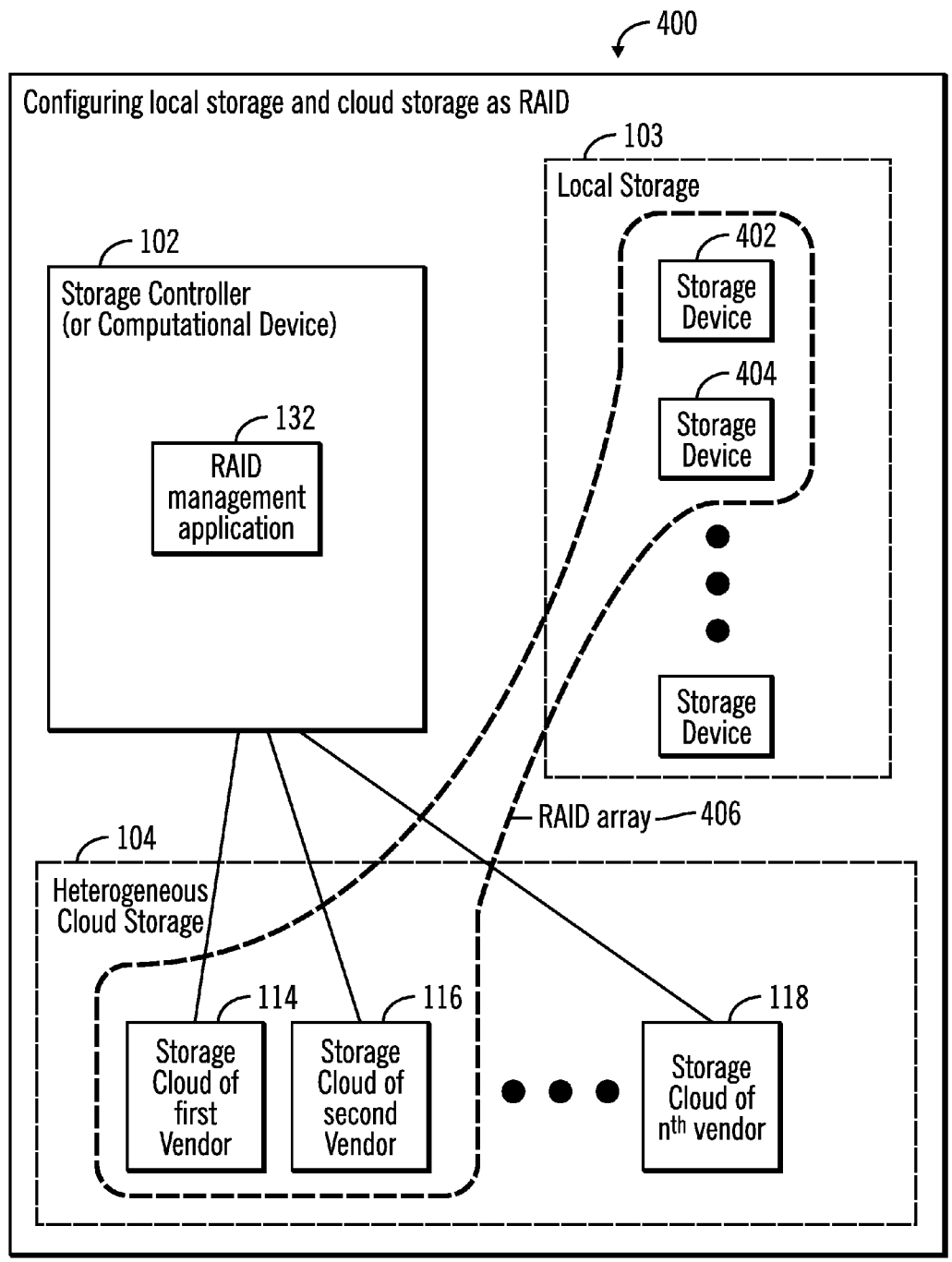
FIG. 4 illustrates a block diagram that shows configuring storage devices of local storage and a plurality of storage clouds as RAID, in accordance with certain embodiments.

FIG. 4 illustrates a block diagram 400 that shows configuring one or more of the storage devices 402, 404 of local storage 103 and a plurality of storage clouds 114, 116 of the heterogeneous cloud storage 104 as RAID, in accordance with certain embodiments.

For example, in certain embodiments a RAID array is created (shown via reference numeral 406) by the RAID management application 132, across storage clouds 114, 116 from different vendors and across some of the storage devices 402, 404 of the local storage 103. The RAID array may be of many different RAID array types, such as RAID-0, RAID-5, RAID-6 or RAID-10. By creating a RAID in the heterogeneous cloud storage 104 and the local storage 103, information is striped. For example, if one of the cloud storage or the local storage is compromised then only a part of a password that is distributed across the RAID array may be compromised.

Therefore, FIG. 4 shows that the RAID management application 132 structures the local storage and the storage clouds of the different vendors as a RAID storage. In additional embodiments, data information and parity information in the RAID are stored in cloud storages provided by different entities (e.g., vendors) and the local storage 103. It should be noted that not all storage clouds and not all storage devices 103 have to be included in the RAID array. Furthermore, only certain of the storage devices of a storage cloud may be included in the RAID array 404.

Therefore, certain embodiments provide an application that creates RAID using the various heterogeneous cloud storages. An interface is provided to access the RAID stack/storage. In addition to being the interface for I/O, the interface provides a granularity of striping. For example, a customer may provide indications to stripe at every byte or stripe at every 512 bytes etc., at the time of creation of the RAID array.

Figure 5:
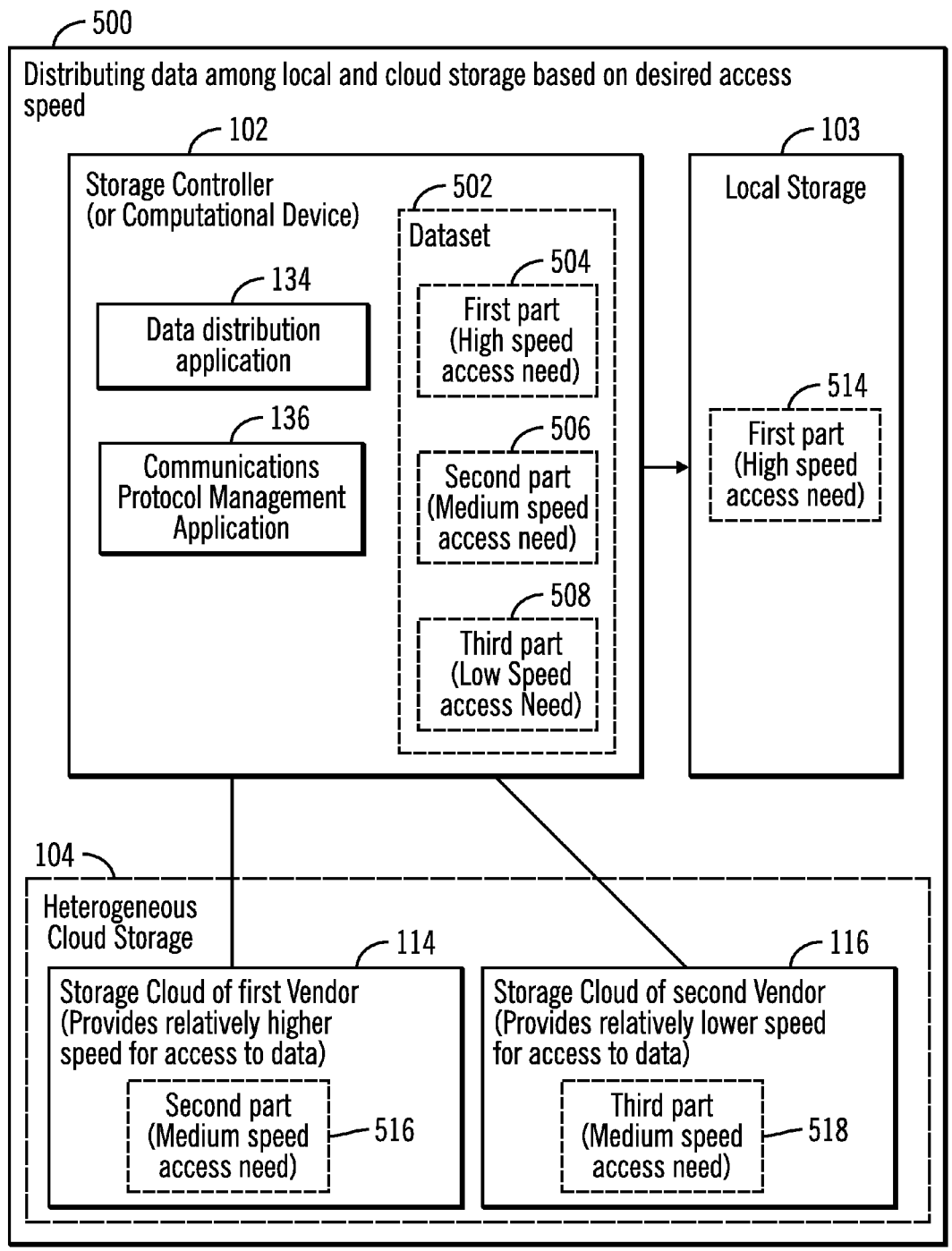
FIG. 5 illustrates a block diagram that shows distribution of data among local and cloud storage based on desired access speed, in accordance with certain embodiments.

FIG. 5 illustrates a block diagram 500 that shows distribution of data among local and cloud storage based on desired access speed, in accordance with certain embodiments. In FIG. 5, the storage controller 102 manages the dataset 502 that comprises a first part 504, a second part 506, and a third part 508. For example, the dataset 502 may comprise a plurality of records, where the first part 504 may comprise the first fields of the records, the second part 506 may comprise the second fields of the record, and the third part 508 may comprise the third fields of the record.

In certain embodiments, the first part 504 may need to be stored such it may be accessed with a high speed, the second part 506 may have to be stored such that is accessed with at least a medium speed, and the third part 508 may tolerate a low speed of access.

In FIG. 5, the storage cloud 114 of the first vendor provides a relatively higher speed of access for data when compared to the storage cloud 116 of the second vendor. In certain embodiments, the storage data distribution application 134 in cooperation with the communications protocol management application 136 stores the first part 504 that requires high access speed in the local storage 103 that provides a greater speed of access than the storage clouds 114, 116 (shown via reference numeral 514). The second part 506 that requires medium speed of access is stored in the storage cloud 114 (shown via reference numeral 516), and the third part 508 is stored in the storage cloud 116 that provides a lower speed of access than the storage cloud 114 (shown via reference numeral 518). Data stored in local storage 103 is accessible faster than data stored in the heterogeneous cloud storage 104 and so the first part 504 that needs to be accessed quickly is stored in the local storage 103 rather than in the storage clouds 114, 116.

Figure 6:
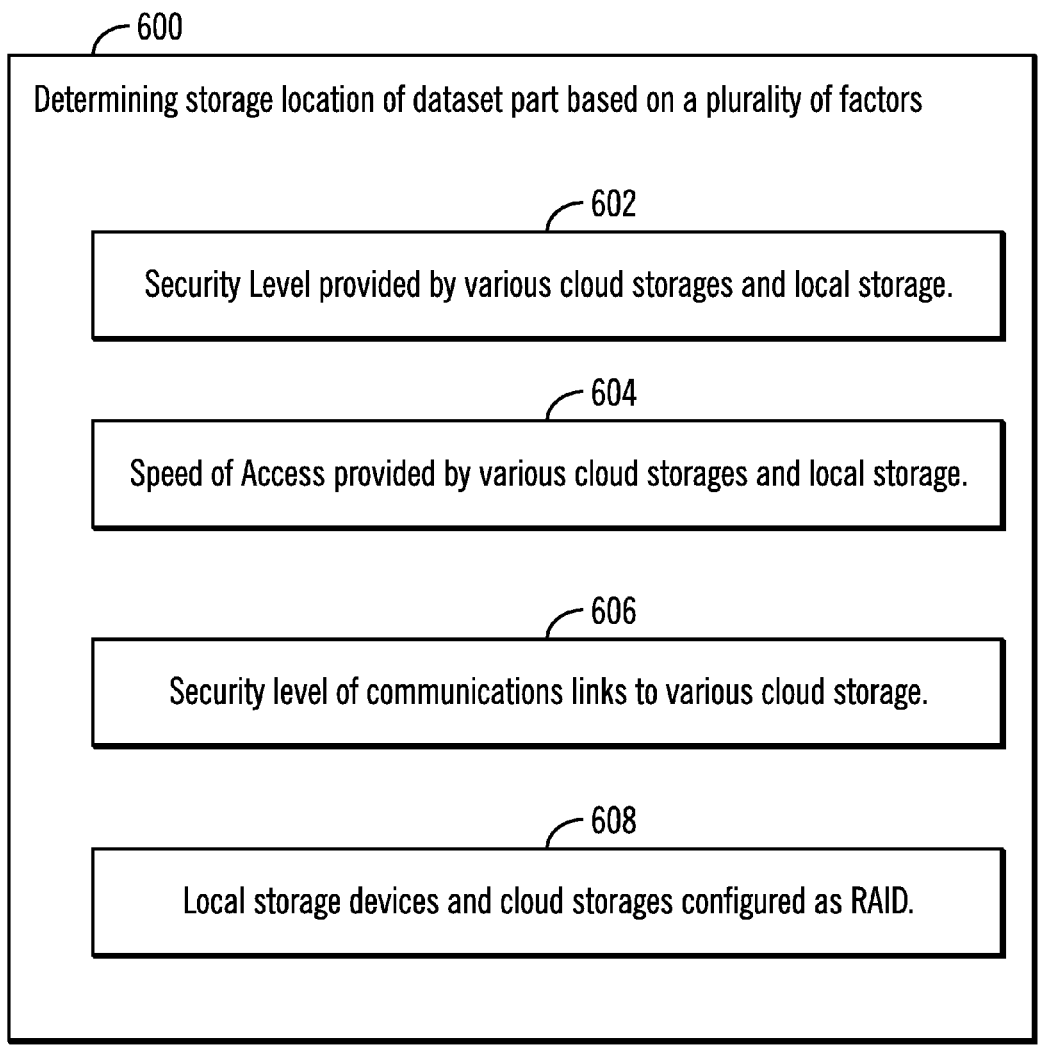
FIG. 6 illustrates a block diagram that shows determining of storage location of a dataset part based on a plurality of factors, in accordance with certain embodiments.

FIG. 6 illustrates a block diagram 600 that shows determining of storage location of a dataset part based on a plurality of factors, in accordance with certain embodiments.

In FIG. 6, determining which part of the dataset to store in local storage 103 and which part of the dataset to store in which of the one or more cloud storages 114, 116, 118 is based on a plurality of factors including security features provided by the one or more cloud storages and the local storage (shown via reference numeral 602), speed of access provided by the one or more cloud storages and the local storage (shown via reference numeral 604), communications protocols for communication with the one or more cloud storages (shown via reference numeral 606), and configuration of local storage devices and selected cloud storages as RAID (shown via reference numeral 608).

Figure 7:
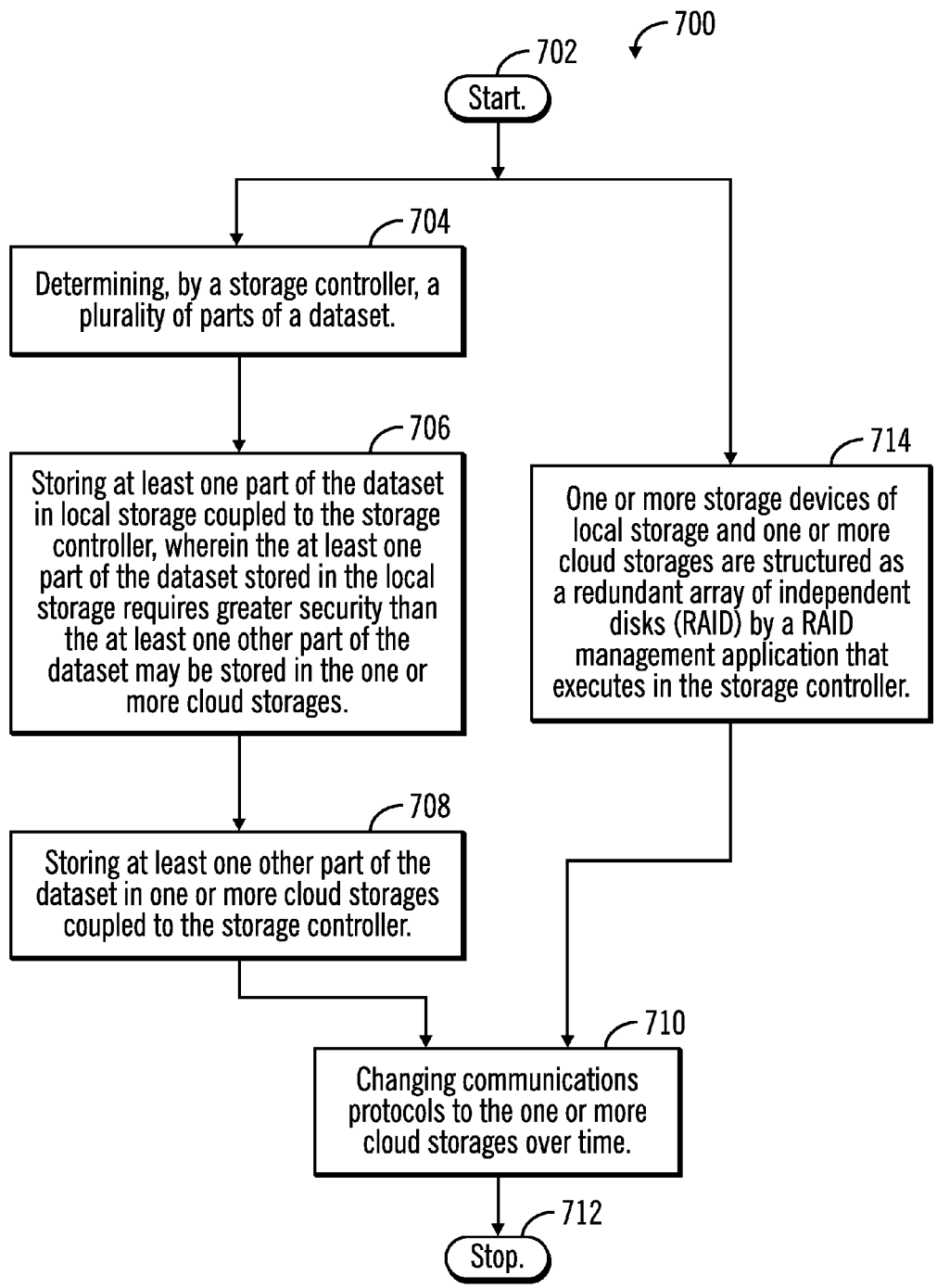
FIG. 7 illustrates a flowchart that shows operations performed by the storage controller, in accordance with certain embodiments.

FIG. 7 illustrates a flowchart 700 that shows operations performed by the storage controller 102, in accordance with certain embodiments. The operations shown in FIG. 7 may be performed by the RAID management application 132, the data distribution application 134, and the communications protocol management application 136 in cooperation with each other as needed.

Control starts at block 702 and proceeds to block 704 in which a storage controller 102 determines a plurality of parts of a dataset. At least one part of the dataset is stored (at block 706) in a local storage 103 coupled to the storage controller 102. The at least one part of the dataset stored in the local storage 103 requires greater security than other parts of the dataset that may be stored in the one or more cloud storages 114, 116, 118.

Control proceeds to block 708, in which the storage controller 102 stores at least one other part of the dataset in one or more cloud storages 114, 116, 118 coupled to the storage controller 102. Subsequently control proceeds to block 710 in which communications protocols 138, 140, 142 to the one or more cloud storages 114, 116, 118 are changed over time or in response to compromised communication protocols, and the process stops (at block 712).

In further embodiments, control proceeds from block 702 to block 714 in which one or more storage devices of a local storage 103 and one or more cloud storages 114, 116, 118 are structured as a redundant array of independent disks (RAID) by a RAID management application 132 that executes in the storage controller 102. From block 714 control proceeds to block 710 to change communications protocols 138, 140, 142 to the cloud storages 114, 116, 118 over time, and then the process stops (reference numeral 712).

The operations of block 704, 706, 708 may be performed subsequent to or in parallel to the operations of block 714. In other words, the storing of the different parts of data in the local storage and different cloud storages may be performed in parallel or after the creation of RAID arrays.

Therefore, FIGS. 1-8 illustrate certain embodiments to distribute different parts of data to local storage and cloud storages provided by different vendors, based on various factors including security needs and requirements on speed of access. Additionally, RAID arrays may be formed from storage devices of the local storage and cloud storage provided by different vendors. As a result, security and redundancy may be provided for data that is distributed across local storage and a plurality of storage clouds of different vendors.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
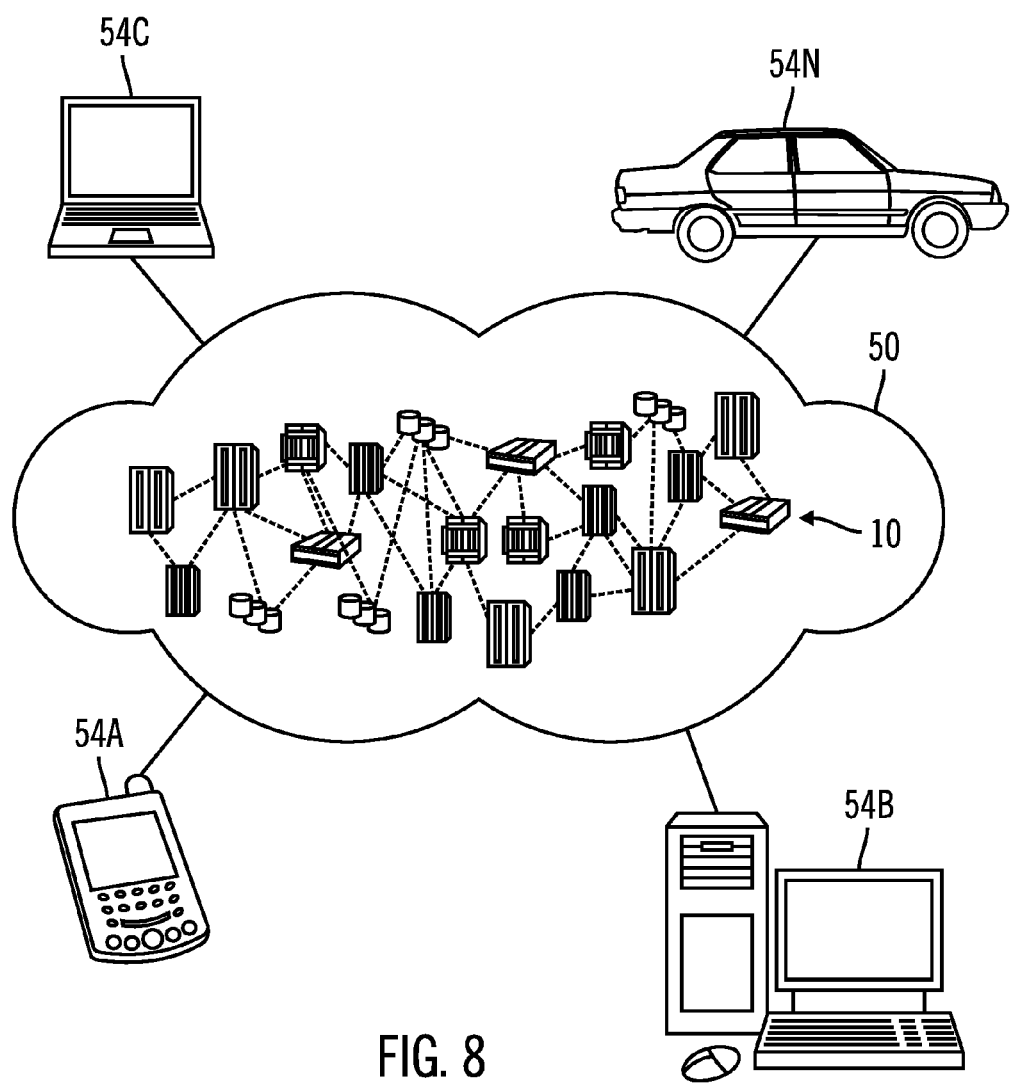
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
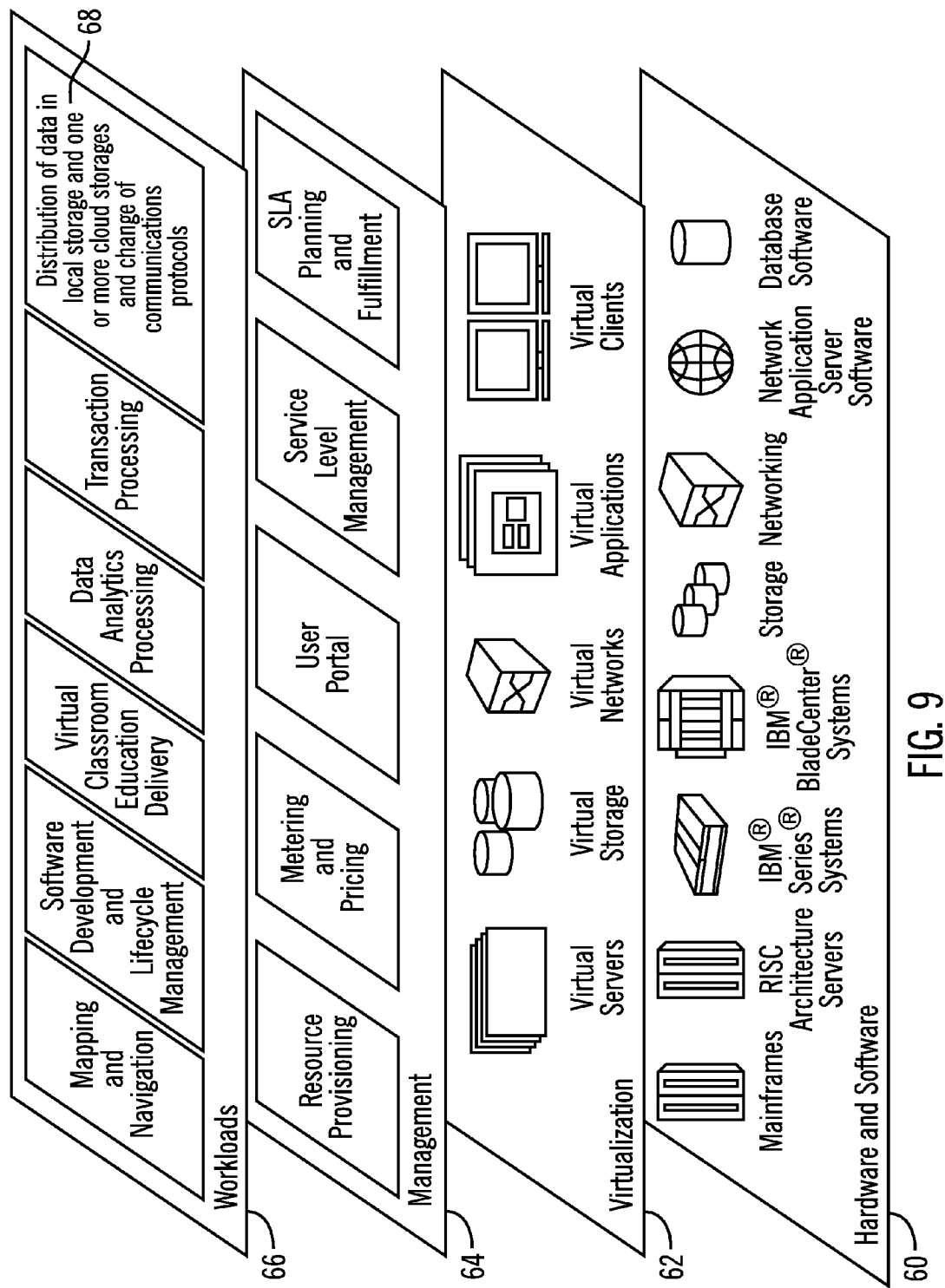
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and functions for distribution of data in local storage and in one or more cloud storages and change of communications protocols (shown via reference numeral 68 in FIG. 9) as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
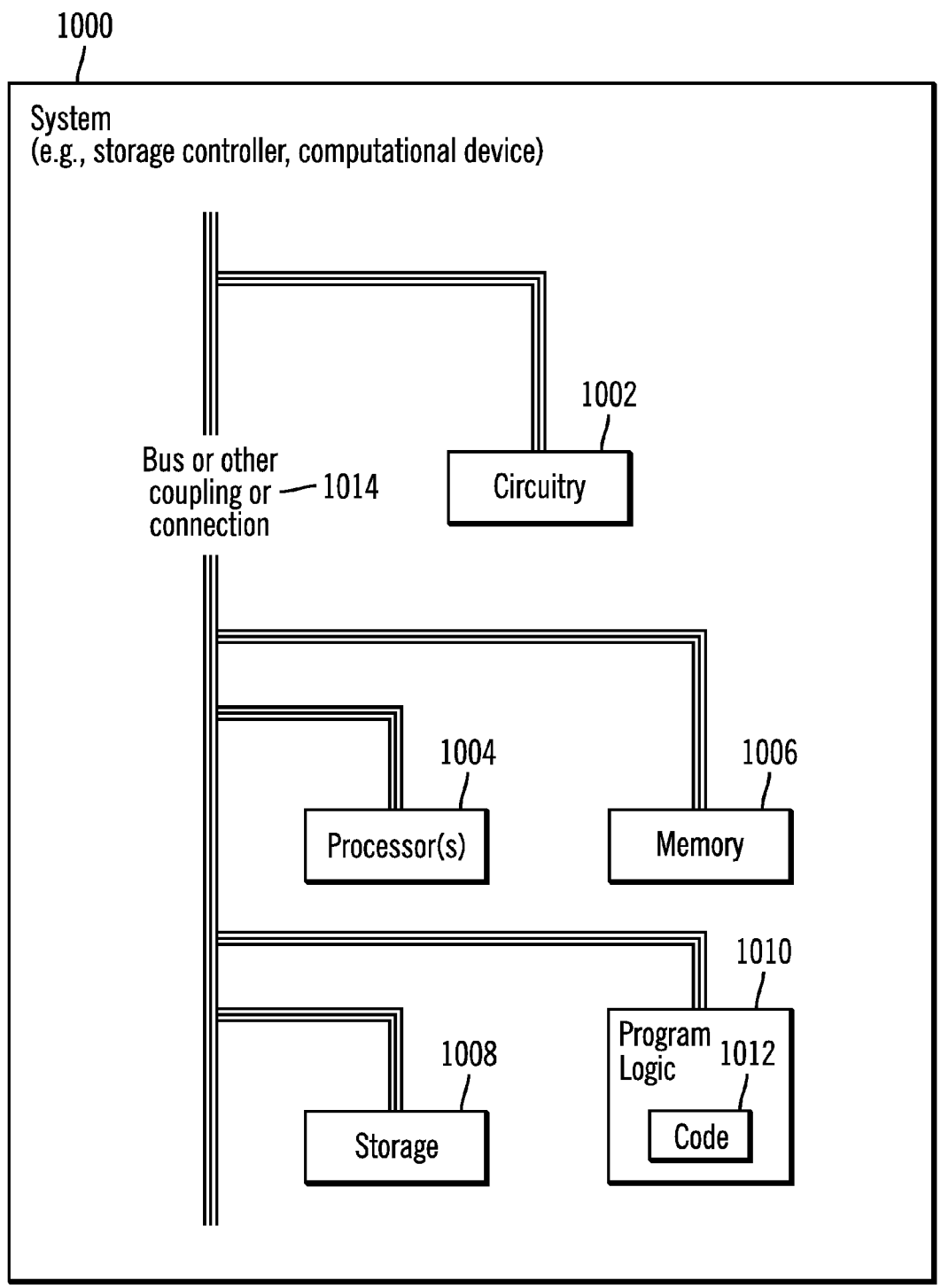
FIG. 10 illustrates a block diagram of a computational system that shows certain elements that may be included in the storage controller including servers shown in FIG. 1, in accordance with certain embodiments.

FIG. 10 illustrates a block diagram that shows certain elements that may be included in the storage controller 102, the servers 110, 112, the hosts 106, 108 or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   determining, by a storage controller, a plurality of parts of a dataset, wherein the plurality of parts of the dataset comprise a first part, a second part, and a third part, wherein the first part has a higher security need for storage than the second part, and wherein the second part has a higher security need for storage than the third part;
   storing the first part of the dataset in local storage of the storage controller; and
   storing the second part of the dataset in a first cloud storage coupled to the storage controller, and the third part of the dataset in a second cloud storage coupled to the storage controller, wherein the first cloud storage provides a relatively higher level of security than the second cloud storage, the method further comprising:
   communicating, by the storage controller, via a first communications protocol with the first cloud storage;
   communicating, by the storage controller, via a second communications protocol that is different from the first communications protocol with the second cloud storage, wherein the first communications protocol provides a relatively higher level of security than the second communications protocol, and wherein the second communication protocol provides a relatively lower level of security than the first communications protocol;
   changing the first communications protocol that provides a relatively higher level of security than the second communications protocol, to another communications protocol, in response to an elapse of a first predetermined amount of time; and
   changing the second communications protocol that provides a relatively lower level of security than the first communications protocol, to a different communications protocol, in response to an elapse of a second predetermined amount of time.

2. The method of claim 1, wherein determining which part of the dataset to store in local storage and which part of the dataset to store in which of one or more cloud storages is based on a plurality of factors including security features provided by the one or more cloud storages and the local storage, speed of access provided by the one or more cloud storages and the local storage, communications protocols for communication with the one or more cloud storages, and configuration of local storage devices and selected cloud storages as RAID.

3. The method of claim 1, wherein the local storage and the first and the second cloud storages are configured as a Redundant Array of Independent Disks (RAID).

4. The method of claim 1, wherein the storage controller is coupled to a plurality of hosts, wherein the first cloud storage is separated at least by 10 kilometers from the second cloud storage, and wherein the first cloud storage and the second cloud storage provide cloud computing services to the storage controller for the plurality of hosts.

5. A system coupled to a local storage and one or more cloud storages, the system comprising:
   a memory; and
   a processor coupled to the memory, wherein the processor performs operations, the operations comprising:
   determining a plurality of parts of a dataset, wherein the plurality of parts of the dataset comprise a first part, a second part, and a third part, wherein the first part has a higher security need for storage than the second part, and wherein the second part has a higher security need for storage than the third part;
   storing the first part of the dataset in the local storage; and
   storing the second part of the dataset in a first cloud storage of the one or more cloud storages, and the third part of the dataset in a second cloud storage of the one or more cloud storages, wherein the first cloud storage provides a relatively higher level of security than the second cloud storage, the operations further comprising:

communicating, via a first communications protocol, with the first cloud storage;

communicating, via a second communications protocol that is different from the first communications protocol, with the second cloud storage, wherein the first communications protocol provides a relatively higher level of security than the second communications protocol, and wherein the second communication protocol provides a relatively lower level of security than the first communications protocol;

changing the first communications protocol that provides a relatively higher level of security than the second communications protocol, to another communications protocol, in response to an elapse of a first predetermined amount of time; and changing the second communications protocol that provides a relatively lower level of security than the first communications protocol, to a different communications protocol, in response to an elapse of a second predetermined amount of time.

6. The system of claim 5, wherein determining which part of the dataset to store in local storage and which part of the dataset to store in which of the one or more cloud storages is based on a plurality of factors including security features provided by the one or more cloud storages and the local storage, speed of access provided by the one or more cloud storages and the local storage, communications protocols for communication with the one or more cloud storages, and configuration of local storage devices and selected cloud storages as RAID.

7. The system of claim 5, wherein the local storage and the one or more cloud storages are configured as a Redundant Array of Independent Disks (RAID).

8. The system of claim 5, wherein the system is a storage controller that is coupled to a plurality of hosts, wherein the first cloud storage is separated at least by 10 kilometers from the second cloud storage, and wherein the first cloud storage and the second cloud storage provide cloud computing services to the storage controller for the plurality of hosts.

9. A computer program product, the computer program product comprising a computer readable storage medium having computer readable program code embodied therewith, the computer readable program code configured to perform operations, the operations comprising:

determining, by a storage controller, a plurality of parts of a dataset, wherein the plurality of parts of the dataset comprise a first part, a second part, and a third part, wherein the first part has a higher security need for storage than the second part, and wherein the second part has a higher security need for storage than the third part;

storing the first part of the dataset in local storage of the storage controller; and storing the second part of the dataset in a first cloud storage coupled to the storage controller, and the third part of the dataset in a second cloud storage coupled to the storage controller, wherein the first cloud storage provides a relatively higher level of security than the second cloud storage, the operations further comprising:

communicating, by the storage controller, via a first communications protocol with the first cloud storage;

communicating, by the storage controller, via a second communications protocol that is different from the first communications protocol with the second cloud storage, wherein the first communications protocol provides a relatively higher level of security than the second communications protocol, and wherein the second communication protocol provides a relatively lower level of security than the first communications protocol;

changing the first communications protocol that provides a relatively higher level of security than the second communications protocol, to another communications protocol, in response to an elapse of a first predetermined amount of time; and changing the second communications protocol that provides a relatively lower level of security than the first communications protocol, to a different communications protocol, in response to an elapse of a second predetermined amount of time.

10. The computer program product of claim 9, wherein determining which part of the dataset to store in local storage and which part of the dataset to store in which of one or more cloud storages is based on a plurality of factors including security features provided by the one or more cloud storages and the local storage, speed of access provided by the one or more cloud storages and the local storage, communications protocols for communication with the one or more cloud storages, and configuration of local storage devices and selected cloud storages as RAID.

11. The computer program product of claim 9, wherein the local storage and one or more cloud storages are configured as a Redundant Array of Independent Disks (RAID), wherein the storage controller is coupled to a plurality of hosts, wherein the first cloud storage is separated at least by 10 kilometers from the second cloud storage, and wherein the first cloud storage and the second cloud storage provide cloud computing services to the storage controller for the plurality of hosts.

12. The method of claim 1, wherein:

the first communications protocol is changed to another communications protocol that is not compromised, in response to a compromise of the first communications protocol via a disclosure of a vulnerability in the first communications protocol that is exploitable for interception of data; and the second communications protocol is changed to a different communications protocol that is not compromised, in response to a compromise of the second communications protocol via a disclosure of a vulnerability in the second communications protocol that is exploitable for interception of data.

13. The system of claim 5, wherein:

the first communications protocol is changed to another communications protocol that is not compromised, in response to a compromise of the first communications protocol via a disclosure of a vulnerability in the first communications protocol that is exploitable for interception of data; and the second communications protocol is changed to a different communications protocol that is not compromised, in response to a compromise of the second communications protocol via a disclosure of a vulnerability in the second communications protocol that is exploitable for interception of data.

14. The computer program product of claim 9, wherein:

the first communications protocol is changed to another communications protocol that is not compromised, in response to a compromise of the first communications protocol via a disclosure of a vulnerability in the first communications protocol that is exploitable for interception of data; and the second communications protocol is changed to a different communications protocol that is not compromised, in response to a compromise of the second communications protocol via a disclosure of a vulnerability in the second communications protocol that is exploitable for interception of data.

15. The method of claim 1, wherein:

the plurality of parts of the dataset comprise another first part, another second part, and another third part, wherein the another first part has a higher security need than the another second part, and wherein the another second part has a higher security need than the another third part;

storing the another first part of the dataset in the local storage of the storage controller;

storing the another second part of the dataset in another first cloud storage coupled to the storage controller, and the another third part of the dataset in another second cloud storage coupled to the storage controller, wherein the another first cloud storage provides a relatively higher speed for access to data than the another second cloud storage.

16. The system of claim 5, wherein:

the plurality of parts of the dataset comprise another first part, another second part, and another third part, wherein the another first part has a higher security need than the another second part, and wherein the another second part has a higher security need than the another third part;

storing the another first part of the dataset in the local storage;

storing the another second part of the dataset in another first cloud storage, and the another third part of the dataset in another second cloud storage, wherein the another first cloud storage provides a relatively higher speed for access to data than the another second cloud storage.

17. The computer program product of claim 9, wherein:

the plurality of parts of the dataset comprise another first part, another second part, and another third part, wherein the another first part has a higher security need than the another second part, and wherein the another second part has a higher security need than the another third part;

storing the another first part of the dataset in the local storage of the storage controller;

storing the another second part of the dataset in another first cloud storage coupled to the storage controller, and the another third part of the dataset in another second cloud storage coupled to the storage controller, wherein the another first cloud storage provides a relatively higher speed for access to data than the another second cloud storage.

* * * * *